Figures 1, 2:
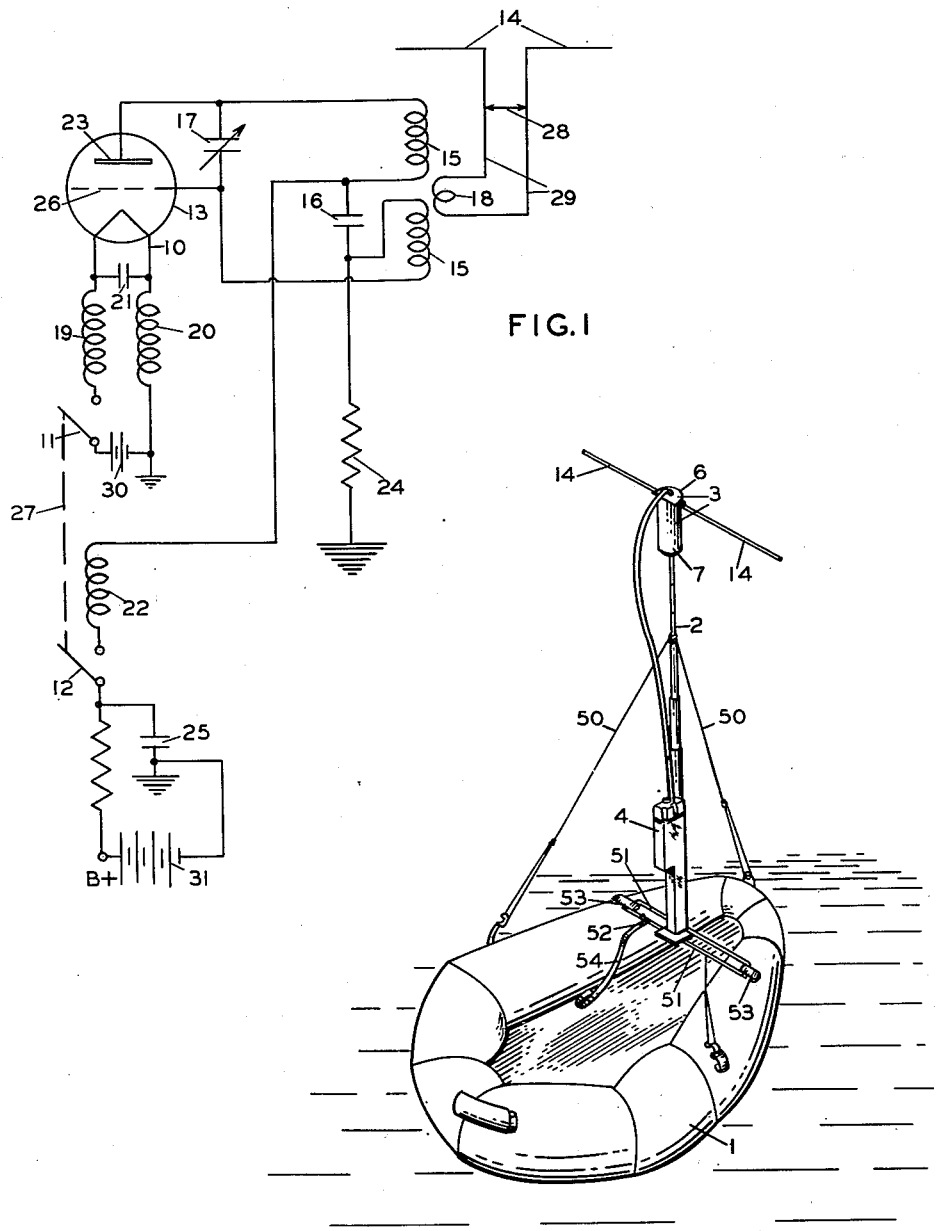

INVENTOR.
SHERMAN J. BROWN
HAROLD J. ROSENBERG
BY BLINN W. RUSSELL, JR.
*William D. Hall.*
ATTORNEY Aug. 28, 1951    B. W. RUSSELL, JR., ET AL    2,565,523
SEA RESCUE TRANSMITTER Filed April 17, 1945      3 Sheets-Sheet 2

*INVENTOR.*
SHERMAN J. BROWN
HAROLD J. ROSENBERG
BY BLINN W. RUSSELL, JR.

*William D. Hall*
ATTORNEY

Aug. 28, 1951  B. W. RUSSELL, JR., ET AL  2,565,523
SEA RESCUE TRANSMITTER

Filed April 17, 1945  3 Sheets—Sheet 3

INVENTOR
SHERMAN J. BROWN
HAROLD J. ROSENBERG
BY BLINN W. RUSSELL, JR.

William D. Hall.
ATTORNEY

Patented Aug. 28, 1951

2,565,523

UNITED STATES PATENT OFFICE 2,565,523

SEA RESCUE TRANSMITTER

Blinn W. Russell, Jr., Dayton, Harold Rosenberg, Springfield, and Sherman James Brown, Dayton, Ohio Application April 17, 1945, Serial No. 588,880

6 Claims. (Cl. 250—17)

(Granted under the act of March 3, 1883, as amended April 30, 1928; 370 O. G. 757)

The invention described herein may be manufactured and used by or for the Government for governmental purposes, without the payment to us of any royalty thereon.

The present invention relates to life-saving and radio beacon apparatus.

Ordinarily, when a pilot is forced to abandon his craft over isolated stretches of water his floating equipment will keep him afloat until rescued if help arrives within a reasonable length of time. The promptness of rescue can be hastened by suitable beacon equipment. Such equipment must be light, portable, and water-tight to withstand submersion and spray.

Accordingly it is an object of the invention to provide a self-contained portable radio transmitting beacon which can be easily carried and assembled by a person swimming in water or seated in a life raft and which will not be rendered inoperative by submersion and consequent fouling of the electrical circuits.

Another object is to provide a radio transmitter employing an extremely simple, efficient circuit and a minimum of components.

A further object is to provide a transmitter wherein the transmitter oscillator is so closely associated with the antenna that transmission line losses are reduced to a minimum.

Another object is to provide a portable beacon transmitter wherein the antenna system is collapsible and is automatically set-up for use by a simple pull on the telescopic mast.

A still further object is to provide a transmitter and associated antenna which can be placed on the top of the antenna mast for directivity and range and which will permit locating the power supply and heavier components at a lower level so as not to render the system top-heavy and unwieldy.

Another object is to provide a water-tight battery pack to power the filament and plate circuits of the beacon transmitter which will be physically separate from the transmitter, and which will be accessible for switching the beacon into or out of operation, or for replacement of batteries or testing purposes without necessitating dismantling of the circuit connections, or damaging the water seal.

A still further object is to provide a continuously operating battery-powered pulsed wave radio beacon, operating on a fixed frequency for reception by a distant receiver employing oscilloscopic projection of the received signals to facilitate determination of range and direction between beacon and receiver.

These and other objects will appear throughout the specifications and will be particularly pointed out in the claims.

Referring to the drawings, wherein like numerals denote like parts,

Figure 1 is an illustration, in schematic form, of the circuit components employed in the invention, Figure 2 is a view in perspective of the transmitter installed on the inflated life raft for transmitting distress signals.

Figure 3:
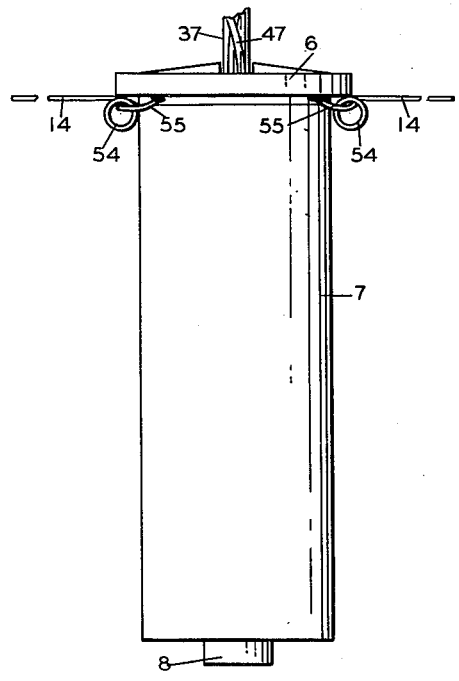
Figure 4:
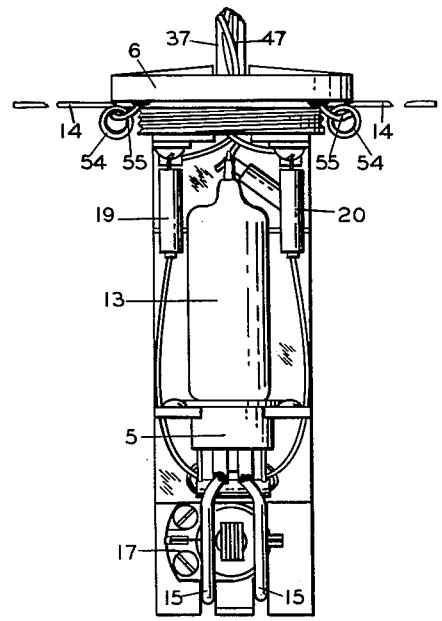
Figure 5:
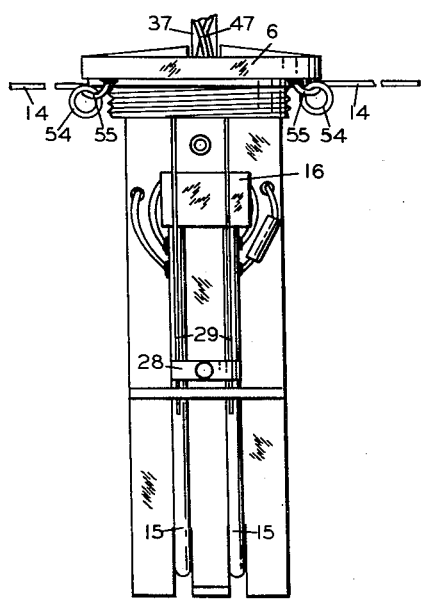
Figure 6:
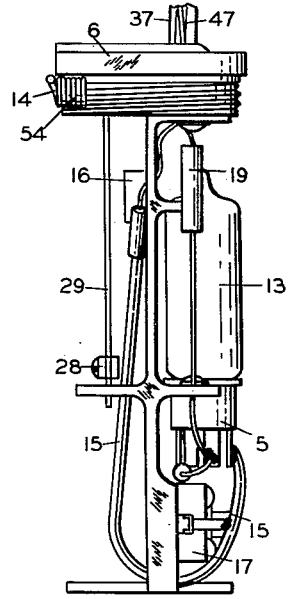
Figure 9:
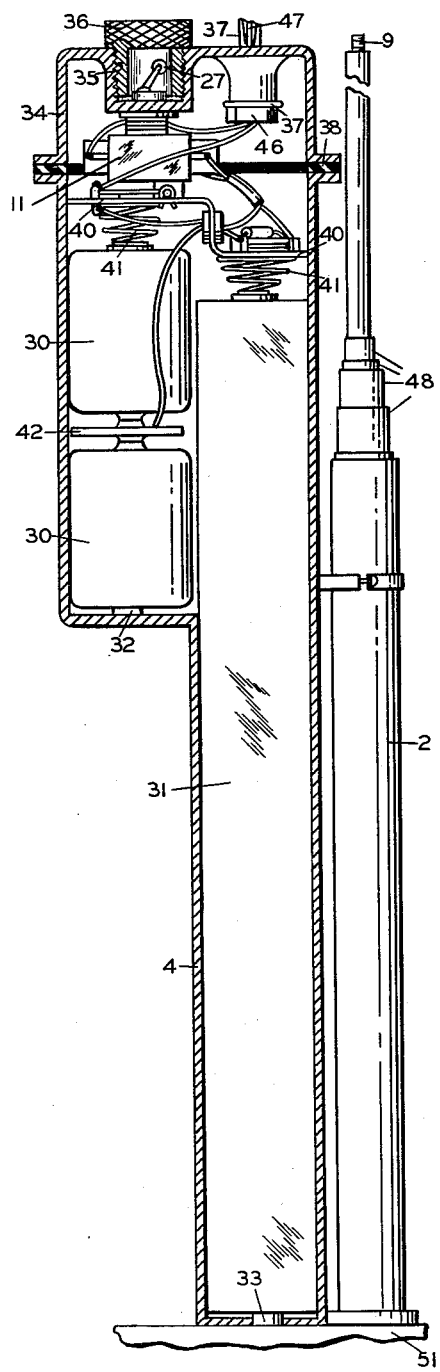
Figure 8:
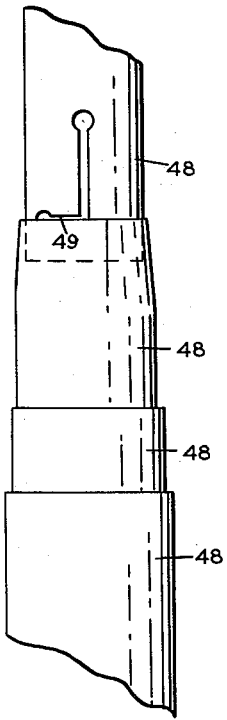
Figure 7:
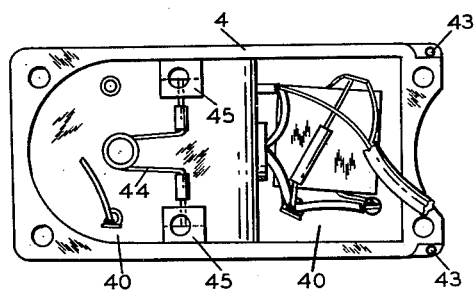

Figure 3 is a vertical elevation of the oscillator housing, with the dipole antenna shown partly broken, Figure 4 is a vertical elevation of the oscillator and its support, with the tubular housing of Figure 3 removed, Figude 5 is a reverse view of the oscillator and support shown in Figure 4, Figure 6 is a side elevation of the oscillator and support shown in Figure 5, Figure 7 is a top plan view of the battery receptacle with the cover removed, exposing to view the terminal block and the circuit leads, Figure 8 is a fragmentary elevational view of the telescopic mast, one of the sections being completely extended to reveal the detent arrangement to retain the mast in extended relation, and;

Figure 9 is a cross-sectional view of the battery retainer taken along one side to reveal the interrelation of its contents.

For the purpose of illustrating an embodiment of the invention reference may be had to the drawings, wherein the inflated life raft 1 is illustrated supporting the extended mast 2 at the upper end of which is secured the transmitter 3 and at the base of which is secured the battery receptacle 4. The transmitter is preferably a single oscillator tube of the miniature type wherein the electrode leads project through the glass envelope. The tube is mounted in a miniature socket 5. This socket is secured to a plastic molded support which in turn is a part of the cap 6 which threadedly engages tubular housing 7 to form a water-tight housing for the transmitting oscillator components. At the base of tubular housing 7 is provided an interiorly threaded boss 8 to engage the threaded end 9 of the telescopic mast 2. The power lead wires from the battery power source enter this housing through a water-tight aperture in cap 6.

In the transmitter (Figure 1) power is fed to the tube filament 10 through filament batteries which are switched into the circuit by ganged single throw double pole switch having a pole 11, which switches filament voltage and pole 12 which switches B+ voltage to the circuit. This switch 11 is the "on-off" switch which sets the entire transmitter into operation. When power is fed to the blocking oscillator 13, the tube goes into oscillation and the radio-frequency energy is fed to antenna 14 through a loosely cupled tank circuit. This tank circuit is comprised of a folded loop coil 15 shunted by a capacitor 16, and tuned to the desired frequency by variable capacitor 17. Coupling to the antenna leads 29 is derived through the coupling loop 15 and the adjacent antenna leads 29 which may be provided with an adjustable shorting bar for setting the antenna to the proper load point in relation to the oscillator 13.

Radio-frequency chokes 19 and 20 serve to isolate the radio frequency energy from filament to ground, while capacitor 21 is employed as the radio frequency by-pass across these chokes.

Another radio frequency choke 22 serves to isolate the radio frequency of the plate 23 of tube 13 from ground.

Resistor 24 is a grid resistor, and in combination with condensers 16 and 25 form the blocking or "squegging" circuit of the oscillator 13 to produce pulsed radio frequency. That is, resistor 24 in parallel with the series combination of condensers 16 and 25 form the control network to control the biasing and unbiasing of grid 26 to produce interrupted or pulsed oscillation of tube 13.

The blocking action of the oscillator 13 operates as follows:

When the oscillator 13 starts oscillating, the feed-back voltage on grid 26 across resistor 24 increases as long as oscillation on the plate increases until the grid reaches such a negative voltage potential that the tube is biased to cut-off. Thus, simultaneously to the driving of the grid to cut-off, an increasing negative voltage is developed across condenser 16 which causes it to charge to the same potential as the voltage across resistor 24. When the grid is driven to cut-off and condenser 16 begins to discharge through resistor 24, to ground, the voltage on grid 26 will gradually become more positive until it reaches the point where oscillation will be resumed, and the oscillation cycle will be repeated.

The pulse repetition frequency of the oscillator is controlled by the values of resistance 24 and condenser 16. When switch lever 27 of single pole double throw ganged switch 11 is thrown to the "on" position, filament current from "A" battery 30 to filament 10 and "B" plate current to grid 26 sets tube 13 into oscillation and the radio frequency current is fed to the dipole antenna 14, the coupling of which to folded loop coil 15 may be made relatively loose or tight by sliding the shorting bar 28 along the antenna feed lines 29. These feed lines 29 are preferably a continuation of the quarter-wave length of the dipole antenna members 14, and although the adjustment along the feed lines will be very small, the output of the antenna is materially affected.

The construction of the battery receptacle 4 is unique in that but a single opening is provided for insertion of both "A" and "B" batteries 30 and 31, the receptacle serving as the ground portion of the electrical circuit to the oscillator 13. Small projections 32 and 33, protruding from the bottom of the receptacle, contact the negative terminals of the batteries for this purpose.

The receptacle opening is covered by a cover plate 34, having a recess formed in its under side to retain the single throw double pole switch 11, the lever 27 of which extends through a water-tight opening into a chambered bore 35 provided with a water-tight screw-cap closure 36. By removal of the closure, even while the battery case is submerged, the transmitter may be set into transmission by actuation of the switch lever 27 and water will not enter the remainder of the battery box or cable sheathing 37 to foul the circuit.

A rubber gasket 38 is provided between the cover plate 34 and the battery receptacle opening edges to form a water-tight seal when secured into place by cap screws. The cover plate may thus be repeatedly removed without permanent damage to the seal.

A terminal block 40, provided with coiled tension springs 41 assists in retaining the batteries 30 and 31 within their respective chambers, the coil springs serving not only to keep the batteries pressed against the bottom of the battery case for good electrical conductivity, but also serve as a portion of the battery circuit through the terminal block 40. An intermediate terminal block 42 is sandwiched between the two cells forming the "A" battery supply 30, so that the center positive contacts of the cells can be connected in parallel to a common lead to obtain the necessary voltage from two cells and so that the case may be used as the negative part or ground of the circuit.

Thus all battery leads are brought to the upper side of block 40 and testing of the circuit is thereby simplified. To remove the terminal block 40 from the case, a coiled spring opposed-prong retainer 44 swiveled on the block 40 is compressed so that the opposed prongs are forced together and out of slots 45 provided in bosses on the inner side walls of battery case 4. The block 40 together with the assembled circuit wires can then be removed from the case 4 and the batteries 30, 31 can be extracted and replaced if necessary.

The power leads 47 to the oscillator 13 leave the case 4 preferably through a water-tight threaded fitting 46 which is provided with a shoulder to grip the water impermeable sheathing 37 thereby excluding any water which might otherwise enter the case at this opening. The antenna sections 14 are coiled adjacent the cap 6 where they emerge from the oscillator housing and act like a coiled spring. Upon extension of the mast 2 to open position, these dipole members spring outwardly when released from their socket apertures 43 provided in the rim of cover plate 34 and assume the position shown in Figure 2. The coiled spring sections 54 are short-circuited by a connector 55 to prevent interference from resultant inductance in the coils.

As will be noted in Figure 8 the extensible mast 2 is made up of a number of telescopic segments 48, the walls of which are incised to provide outwardly-bent spring detents 49 which prevent telescopic collapse of the segments when in an extended position. Guy cables 50 retain the mast in an upright position when extended, the base of battery box 4 being secured to base strapping 51 which supports the entire mast, battery box and transmitter. A unique safety feature incorporated in this base strapping is the emergency release snap 52 which breaks the strapping at this point, thereby allowing the strapping to pull through the anchorage loops 53 on the sides of the life raft 1. When the emergency strap 54 unsnaps fastener 52 the entire mast will fall and eliminate the danger of trapping the occupant of the raft.

Though the transmitter is described as particularly applicable for rescue on water it is obvious that the apparatus may be employed for operations on land as well; and while the preferred embodiment of the invention has been herein described, it is understood that changes in the details thereof may be made without departing from the spirit or scope of the invention as claimed.

Having thus described the invention, what is claimed is:

1. A radio transmitter of the class described and comprising a water-tight chambered housing for housing the transmitter and provided with water-tight leads to the transmitter power supply and its antenna, an oscillator together with its circuit components mounted on a base secured to the interior of said housing, dipole antenna members extending through said housing, a folded coupling loop for coupling the oscillator output to the antenna, parallel leads forming a portion of the antenna and extending alongside the coupling loop, and said dipole transmitting antenna members extending through said watertight compartment through water-tight apertures so that the transmitter is sealed against entry of water when temporarily immersed.

2. A radio transmitter of the class described comprising a two-piece separable water-tight housing, a supporting member secured to the inner surface of one member of the housing, said supporting member being made of a dielectric material to retain the circuit components of the transmitter in electrically insulated relationship, and having a projection to support a vacuum tube oscillator and being slotted to retain a folded antenna coupling loop against lateral displacement, a vacuum tube oscillator together with its circuit components secured to said supporting member so that the entire transmitter is self-contained on one of the two separable members, and a mechanical interlocking member on one of said housing members for securing said transmitter to a mast.

3. A radio transmitter of the class described comprising a two-piece separable water-tight housing, a supporting member secured to the inner surface of one member of the housing, a vacuum tube oscillator, a folded loop coupler and adjacent loosely coupled shorted bar antenna leads with dipole antenna extensions protruding outwardly of the housing, said supporting member being formed of dielectric material and supporting the vacuum tube oscillator together with its transmitting circuit components whereby the entire transmitter assembly may be made removable for adjustment and water-tight when securely assembled, and line losses from the oscillator to the antenna through transmission lines will be reduced to a minimum.

4. As an article of manufacture, a water-tight power supply pack for a radio transmitter of the class described and comprising a chambered receptacle provided with renewable filament and plate batteries and being open at one end; a recessed cover plate for said opening; a sealing element to form a water-tight joint between the receptacle and the recessed cover plate; said recessed cover plate having a removable water-tight closure to form a water-tight chamber separate from the battery chamber; a switch member for the power supply circuit secured within the recessed portion of said cover plate, and the lever of said switch protruding into the cover chamber in substantially water-tight relationship so as to be accessible through the cover plate while the cover plate is securely fastened on the chambered receptacle, and a water-tight outlet in said recessed cover for the power cables, said outlet having means for gripping in water-tight relationship a water-proof cable sheathing so as to make said power pack and the power cables water-tight at all openings when the cable sheathing is similarly secured to a receptacle at the opposite end.

5. A water-tight power supply receptacle as claimed in claim 4, including a terminal block adjacent the opening of the receptacle and removably secured to the inner surfaces of the receptacle by a spring-pressed closure element to permit quick testing of the batteries through the outwardly protruding circuit terminals and also to permit quick replacement of the batteries with the circuit wiring intact.

6. A sea rescue apparatus comprising an inflatable life raft, a plurality of anchorage loops secured about the sides of said raft, a taut supporting strap looped through two of said anchorage loops which are on opposite sides of said life raft, an emergency release snap fastened to said supporting strap for breaking said supporting strap, a telescopic mast secured at its base on said supporting strap, a plurality of guy wires, each secured at one end to said mast at an intermediate point thereof and at the other end to a different one of said anchorage loops for providing further support for said mast, a radio beacon comprising two component units, the first of said units including batteries in a first water-tight container, said container being rigidly mounted on said mast at the base thereof, said first unit being the power supply for said beacon, the second of said units including a tuned radio frequency oscillator enclosed in a second water-tight container, a dipole antenna rigidly mounted directly on said second container and a connection from the output of said oscillator to said antenna, said second container being rigidly mounted on said mast at the top thereof, and a water-tight power supply line interconnecting said first unit with said second unit through water-tight seals in said first and second containers.

BLINN W. RUSSELL, JR.
HAROLD ROSENBERG.
SHERMAN JAMES BROWN.

REFERENCES CITED

The following references are of record in the file of this patent:

UNITED STATES PATENTS

| Number | Name | Date |
| --- | --- | --- |
| 2,070,112 | Bowles | Feb. 9, 1937 |
| 2,291,767 | Shore | Aug. 4, 1942 |
| 2,310,017 | Canon et al. | Feb. 2, 1943 |
| 2,311,491 | Turner | Feb. 16, 1943 |
| 2,334,211 | Miller | Nov. 16, 1943 |
| 2,423,836 | Lake et al. | July 15, 1947 |
| 2,439,408 | Mitchell | Apr. 13, 1948 |